J. Cobleigh,
Saw-Mill Dog.
No. 86,136. Patented Jan. 26, 1869.
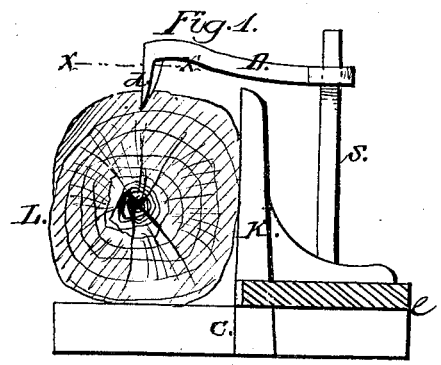
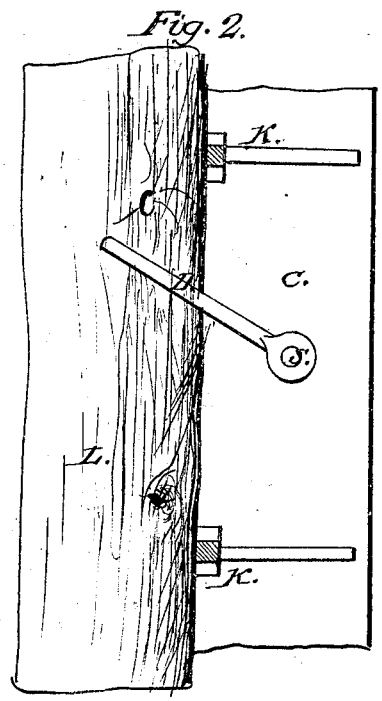
Witnesses:
C. A. Pettit
A. M. Tanner
Inventor:
James Cobleigh
by Munn & Coe
Attorneys

JAMES COBLEIGH, OF MORRISTOWN, VERMONT.

Letters Patent No. 86,136, dated January 26, 1869.

IMPROVEMENT IN SAW-MILL DOG.

The Schedule referred to in these Letters Patent and making part of the same.

*To all whom it may concern:*

Be it known that I, JAMES COBLEIGH, of Morristown, in the county of Lamoille, and State of Vermont, have invented a new and improved Saw-Mill Dog; and I do hereby declare the following to be a full, clear, and exact description of the same, sufficient to enable others skilled in the art to which the invention appertains, to fully understand and use it, reference being had to the accompanying drawings, forming part of this specification, and in which—

Figure 1 is a side view,

Figure 2, a top view, and

Figure 3, a horizontal section through line $x\ x$ in of fig. 1.

The object of this invention is to construct a saw-mill dog in such a manner that, from its peculiar form and operation, it will grasp the log, and hold it firmly against the knees, not pushing it slightly therefrom when first driven into the log, as in the case of those heretofore in use.

The difficulty just referred to as inseparable from the old form of saw-mill dogs, results from the fact that the part which holds the log is hinged or jointed to the surface of the carriage, and when used, must assume an inclined position, its tooth resting upon the upper side of the log, and entering the wood at an inclination from a vertical line, and in a direction from the knees. Of course, under such circumstances, when the tooth is driven into the log, it pushes the latter slightly away from the knees, and the log loses their support. Not only is it held less firmly, therefore is more likely to work loose, but it is liable to turn slightly on the tooth as a pivot, and render the thickness of the board at one end greater than at the other.

This will be readily understood by reference to the drawings, in which—

L represents the log;

C, the carriage;

K, the knees; and

D, the dog.

If the dog D, instead of being attached to the upright standard S, as shown, were merely jointed to a staple or ring at the lower end of such standard, on the horizontal line indicated by $c$, fig. 1, it is evident that, in driving its tooth into the upper side of the log, its inclination would give it a strong tendency to force the log away from the knees.

To obviate this difficulty, I fasten the vertical standard S firmly to the carriage, making it long enough to allow the dog D to be raised to a horizontal line with the top of the largest log which will be operated upon, without slipping from its upper end.

I construct the dog in the form shown in figs. 1, 2, and 3, drilling a straight hole vertically through its rear end, and making said hole a little longer than the standard, so that the dog will slip freely up and down upon the latter, when perfectly horizontal will "bite" against the standard, and refuse to move up or down when not perfectly horizontal.

The instrument is now ready for use, and its operation is very simple, and perfectly effective, completely avoiding the difficulty above described.

When the tooth $d$ is driven into the log, it enters in a vertical line, and holds the log firmly against the knees.

If the tooth be inclined inward a little, or its front side being made vertical, its rear side being inclined, bevelled, or made tapering toward the point, as seen in fig. 1, its tendency, when driven into the log, will be to draw the latter more firmly to the knees.

The front corners of the vertical tooth $d$ may be bevelled off, as shown at $e\ e$, fig. 3, for the purpose of accommodating the saw, as there shown, the saw being represented in red lines at A.

Having thus described my invention,

What I claim as new, and desire to secure by Letters Patent, is—

The combination of the vertical standard S and dog D, having the tooth $d$, as herein described, when used in connection with a saw-mill carriage, substantially as and for the purpose specified.

In testimony that I claim the foregoing, I hereunto set my hand.

JAMES COBLEIGH.

Witnesses:
 E. N. PORTER,
 R. E. COBLEIGH.